(12) United States Patent
Simhon et al.

(10) Patent No.: US 12,512,213 B2
(45) Date of Patent: Dec. 30, 2025

(54) SYSTEMS AND METHODS FOR REAL TIME WORKLOAD BALANCING

(71) Applicant: KONINKLIJKE PHILIPS N.V., Eindhoven (NL)

(72) Inventors: Eran Simhon, Cambridge, MA (US); Lasith Adhikari, Cambridge, MA (US); Gregory Boverman, Cambridge, MA (US); David Paul Noren, Sharon, MA (US); Chaitanya Kulkarni, Bangalore (IN); Larry James Eshelman, Ossining, NY (US); Syamanthaka Balakrishnan, Bangalore (IN); Vikram Shivanna, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 731 days.

(21) Appl. No.: 17/879,938

(22) Filed: Aug. 3, 2022

(65) Prior Publication Data

US 2023/0049068 A1    Feb. 16, 2023

Related U.S. Application Data (60) Provisional application No. 63/229,237, filed on Aug. 4, 2021.

(51) Int. Cl.
*G16H 40/20* (2018.01)

(52) U.S. Cl.
CPC .................. *G16H 40/20* (2018.01)

(58) Field of Classification Search
CPC ........................................ G16H 40/20
USPC ........................................ 705/2–3
See application file for complete search history.

(56) References Cited

U.S. PATENT DOCUMENTS

2021/0193302 A1*  6/2021  Day ................... G06Q 10/0631
2021/0280287 A1*  9/2021  Mahmood ............. G16H 10/60

OTHER PUBLICATIONS

Van den Oetelaar et al., Balancing Nurses' Workload In Hospital Wards: Study Protocol of Developing A Method To manage Workload, BMJ Open, Nov. 10, 2016, pp. 1-11, https://pubmed.ncbi.nlm.nih.gov/28186931/ (Year: 2016).*

Van den Oetelaar et al., Balancing Workload of Nurses: Linear Mixed Effects Modelling To Estimate Required Nursing Time On Surgical Wards, Nursing Open, Sep. 2019, pp. 1-11, https://onlinelibrary.wiley.com/doi/full/10.1002/nop2.385 (Year: 2019).*

(Continued)

*Primary Examiner* — Joy Chng (57) ABSTRACT

Disclosed herein is a system for generating real time staffing recommendations for a hospital. The system receives data, including transition data for multiple patients, medical data for the multiple patients, and staffing data. Using the data, the system determines a transition probability for each patient and a predicted workload for each patient. The system simulates unit workloads for multiple units in the hospital using the transition probability and predicted workload for each patient. The system generates staffing recommendations using the simulated unit workloads and displays the staffing recommendations on a user display.

20 Claims, 5 Drawing Sheets

(56) References Cited

OTHER PUBLICATIONS

Hall, L.H. et al., "Healthcare Staff Wellbeing, Burnout, and Patient Safety: A Systematic Review." PLoS One. Jul. 8, 2016;11(7):e0159015. doi: 10.1371/journal.pone.0159015. PMID: 27391946; PMCID: PMC4938539.

Van Den Oetelaar, W.F.J.M. et al., "Balancing nurses' workload in hospital wards: study protocol of developing a method to manage workload". https://pubmed.ncbi.nlm.nih.gov/28186931/.

Van Den Oetelaar, W. et al., "Balancing workload of nurses: Linear mixed effects modelling to estimate required hursing time on surgical wards." https://onlinelibrary.wiley.com/doi/full/10.1002/nop2.385.

Trilling, L. et al., "Nurse scheduling using integer linear programming and constraint programming." https://hal.archives-ouvertes.fr/hal-00173072/document.

Bagheri, M. et al., "An application of stochastic programming method for nurse scheduling problem in real word hospital." https://www.sciencedirect.com/science/article/abs/pii/S036083521630050X.

Friesen, M.R. et al., "Load Balancing at Emergency Departments using Crowdinforming." https://www.ncbi.nlm.nih.gov/pmc/articles/PMC3615787/.

* cited by examiner

Fig. 5

SYSTEMS AND METHODS FOR REAL TIME WORKLOAD BALANCING

FIELD OF THE DISCLOSURE

The present disclosure is directed generally to methods and systems for balancing real time workload.

BACKGROUND

Balancing the staff to workload ratio is a critical component of hospital management and impacts staff satisfaction, patient safety, and hospital finances. A balanced clinician workload is a key component to achieving the Quadruple Aim. The stochastic nature of hospital demands makes it almost impossible to predict accurately staffing needs in advance. Thus, having overloaded or underloaded staff is very common in hospitals. Overloaded staff may lead to medical errors and poor medical outcomes and underloading leads to unnecessary expenses. Overloading is typically solved by calling in on-call clinicians or having other staff members work additional unplanned shifts which leads to higher costs and staff burnout.

A proper workload balance necessitates careful optimization rather than merely maximizing or minimizing staff loading. Some studies have addressed the issue of workload balancing and proposed models to estimate patient care time based on patient characteristics. Other studies have proposed computing nurse activity using a Delphi study. Conventional methods however, do not have the ability to predict future staffing needs or provide recommendations to shift staff in real time or early. Shifting clinicians during their shift has set-up time, and should only be done when it is clear that such shifting will be beneficial. Additionally, workload in each unit can dynamically change and a unit that is over-staffed now might not be over-staffed in the next hour. Hence, shifting clinicians should only be done when staff availability and workload are predicted for the next few hours and it is clear that staff shifting will be beneficial. Currently, hospitals do not have the technical capabilities and the bandwidth to perform such ad-hoc estimations and hence, staff shifting during shifts are not common.

SUMMARY OF THE DISCLOSURE

There is a continued need for balancing and optimizing the workload of clinical staff. The present disclosure is directed at inventive methods and systems for managing the workload of clinical staff by providing real time staffing needs and recommendations. Various embodiments and implementations herein are directed to a system or method to reduce underloading and overloading by shifting clinicians between different units of the hospital, based on real-time estimations and predictions of workload. The system combines machine learning, simulation and optimization to recommend clinicians shifting between units to balance the overall workload in a hospital.

Various embodiments and implementations herein are directed to a system or method to (i) estimate current workload and current staff availability; (ii) predict near future staff availability and workload; (iii) suggest optimal ad-hoc staff shifting.

According to an embodiment, a method for generating, using a workload balancing system, staffing recommendations, comprising receiving, by the workload balancing system, transition data for each of a plurality of patients; receiving, by the workload balancing system, medical data for each of the plurality of patients; receiving, by the workload balancing system, staffing data; determining, by a processor of the workload balancing system comprising a trained transition machine learning algorithm and using the received data, a transition probability for each of a plurality of patients; determining, by a processor of the workload balancing system using the received data, a predicted workload to be generated by each of the plurality of patients; simulating, by a processor of the workload balancing system using the transition probability for each of a plurality of patients and the predicted workload to be generated by each of the plurality of patients, a predicted workload for each of a plurality of units in the hospital; generating, by a processor the workload balancing system comprising an optimization engine and using the received data and the predicted workload for each of a plurality of units, staffing recommendations; and displaying the generated staffing recommendations on a user display of the workload balancing system.

According to an aspect, the method further comprises the step of pre-processing, by the processor of the workload balancing system, the received data.

According to an aspect, the method further comprises the step of training the transition machine learning algorithm, comprising (1) receiving a dataset of transition data, the dataset comprising transition data for each of a plurality of patients; (2) extracting from the dataset features indicative of patient transitions; and (3) training the transition machine learning algorithm using the extracted features.

According to an aspect, the method wherein a trained workload machine learning algorithm is used in the step of determining, by a processor of the workload balancing system using the received data, a predicted workload to be generated by each of the plurality of patients.

According to an aspect, the method further comprises the step of training the workload machine learning algorithm, comprising: (1) receiving a dataset of medical data, the dataset comprising medical data for each of a plurality of patients; (2) extracting from the dataset features indicative of patient workload; and (3) training the workload machine learning algorithm using the extracted features.

According to an aspect, the method further comprises the step of determining, by a processor of the workload balancing system using the received data using the predicted transition probabilities for each of the plurality of patients, a predicted inflow and outflow rate for each of the plurality of units.

According to an aspect, the method wherein the trained transition machine learning algorithm is a Recurrent Neural Networks algorithm.

According to an aspect, the method wherein the simulation process comprises the following steps: (1) setting workload of all units to zero; (2) for each patient of the plurality of patients: (i) realizing transit based on the predicted transit probabilities; (ii) adding the workload associated with the realized transit to the relevant unit; and (iii) dividing the total hourly unit workload by total number of nurses at that hour; (3) repeating steps 1-4 k times and store the results; and (4) for each unit, computing 90% confidence interval from the results of all repetitions.

According to an aspect, the method further comprises the step of inputting, user defined parameters into the optimization engine.

According to an embodiment, a workload balancing system configured to generate staffing recommendations, comprising a classifier trained to generate a transition probability for each of a plurality of patients; received data comprising medical data about each of the plurality of patients, transition data for each of a plurality of patients, and staffing data; a processor configured to: (1) determine, using the classifier and using the received data, a transition probability for each of a plurality of patients; (2) determine, using the received data, a predicted workload to be generated by each of the plurality of patients; (3) simulate, using the transition probability for each of a plurality of patients and the predicted workload to be generated by each of the plurality of patients, the future workload for each of a plurality of units in the hospital; and (4) generate, by a processor the workload balancing system, staffing recommendations; and a display configured to display the generated staffing recommendations.

According to an aspect, the system further comprising the step of training the transition machine learning algorithm, comprising: (1) receiving a dataset of transition data, the dataset comprising transition data for each of a plurality of patients; (2) extracting from the dataset features indicative of patient transitions; and (3) training the transition machine learning algorithm using the extracted features.

According to an aspect, the system further comprising a trained workload machine learning algorithm is used in the step of determining, by a processor of the workload balancing system using the received data, a predicted workload to be generated by each of the plurality of patients.

According to an aspect, the system further comprising the step of training the workload machine learning algorithm, comprising: (1) receiving a dataset of medical data, the dataset comprising medical data for each of a plurality of patients; (2) extracting from the dataset features indicative of patient workload; and (3) training the workload machine learning algorithm using the extracted features.

According to an aspect, the system further comprising the step of determining, by a processor of the workload balancing system using the received data using the predicted transition probabilities for each of the plurality of patients, a predicted inflow and outflow rate for each of the plurality of units.

According to an embodiment, a workload balancing system configured to generate staffing recommendations, comprising a communication interface configured to received data comprising medical data about each of the plurality of patients, transition data for each of a plurality of patients, and staffing data; a classifier trained to generate a transition probability for each of a plurality of patients; a processor configured to: (1) determine, using the classifier and using the received data, a transition probability for each of a plurality of patients; (2) determine, using the received data, a predicted workload to be generated by each of the plurality of patients; (3) simulate, using the transition probability for each of a plurality of patients and the predicted workload to be generated by each of the plurality of patients, the future workload for each of a plurality of units in the hospital; and (4) generate, by a processor the workload balancing system, staffing recommendations; and a display configured to display the staffing recommendations.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure describes various embodiments of a system and method for generating staffing recommendations comprising transition probabilities and the workload predicted. Applicant has recognized and appreciated that it would be beneficial to provide a method and system that can (i) estimate current workload and current staff availability; (ii) predict future staff availability and workload; and (iii) suggest optimal ad-hoc staff shifting. The system receives information relevant to anticipated workload and patient transitions, including clinical data obtained for individual patients in real time. The system uses a trained machine learning algorithm and the received information to generate a predicted workload for the next 12 hours for each unit. The system generates recommendations to shift nurses comprising the determined workload for each unit, and displays the recommendations on a user display, including a display of the predicted workload and occupancy.

Figure 1:
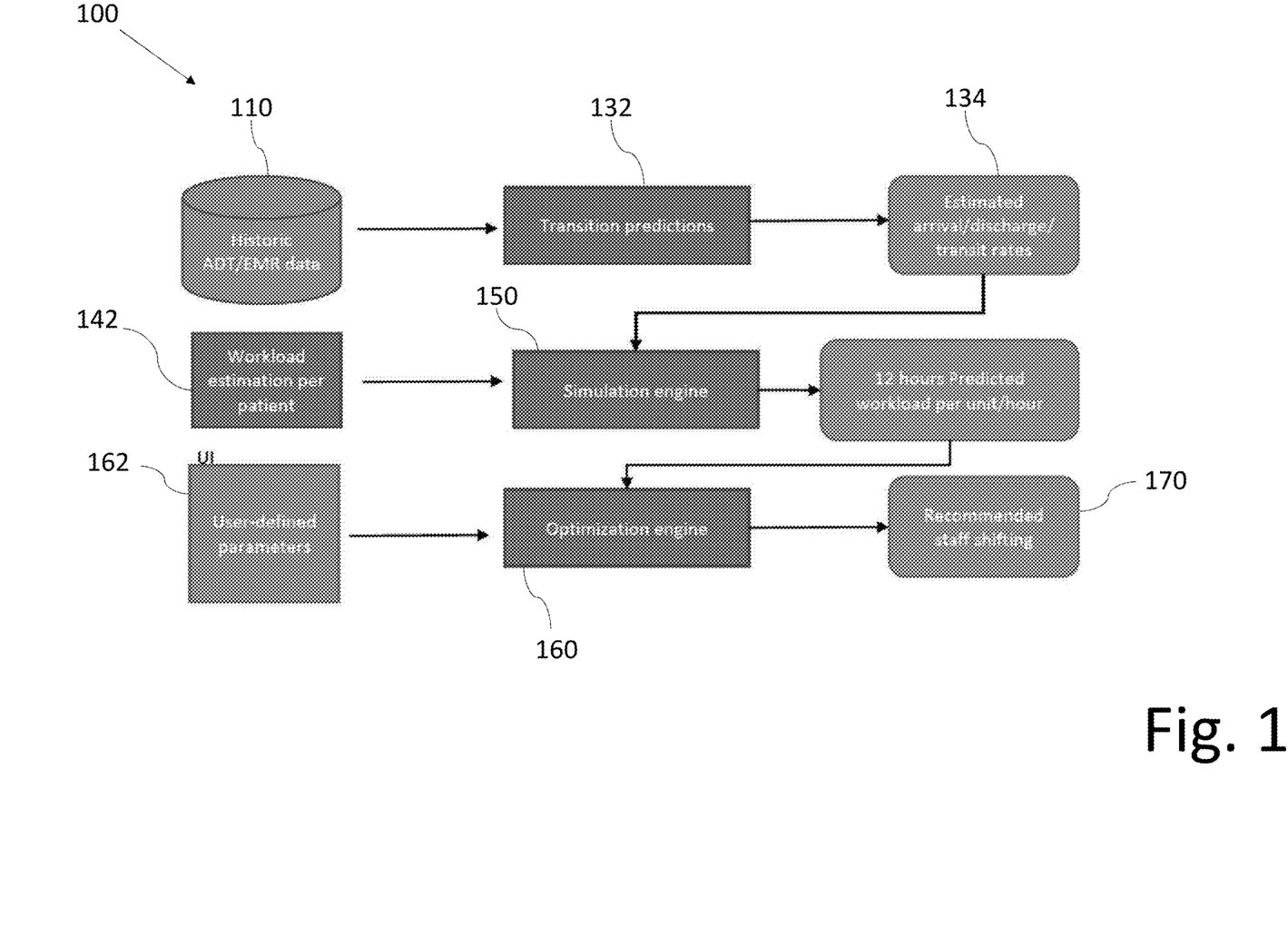
FIG. 1 is a flowchart of a method for generating staffing recommendations using a workload balancing system, in accordance with an embodiment.

Referring to FIG. 1, in one embodiment, is a flowchart of a method 100 for performing, using the workload balancing system, an analysis of anticipated workload and patient transitions for the next 12 hours for each unit. The workload balancing system may be any workload balancing system described or otherwise envisioned herein.

According to an embodiment, the workload balancing system may be embodied in whole or in part within a device. For example, the entire workload balancing system may be embodied within a single device such as a handheld device, laptop, computer, or other single device. Alternatively, the workload balancing system may comprise a user interface that is transportable, such as a handheld device, mobile phone application, computer, or other transportable element that functions as a user interface to receive information. The device will communicate the information to another, remote component of the workload balancing system for analysis. The result of the workload balancing system may then be communicated back to the transportable user interface.

For purposes of this disclosure the system receives information for each patient at a hospital to generate a report for properly staffing nurses at each unit in a hospital. However, this system can be applied to other facilities including medical and non-medical facilities on a larger or smaller scale. Similarly, the system can be used to generate a report for other non-nursing staff.

At step 110 of the method, the workload balancing system 200 receives training data. As discussed in greater detail herein, the real time workload balancing system comprises a machine learning algorithms, also called classifiers. According to one embodiment the workload balancing system 200 comprises two machine learning algorithms, one that has been trained to determine predicted patient transitions and one trained to determine predicted workload. Each machine learning algorithm of the workload balancing system can be trained using a dataset of training data.

Figure 2:
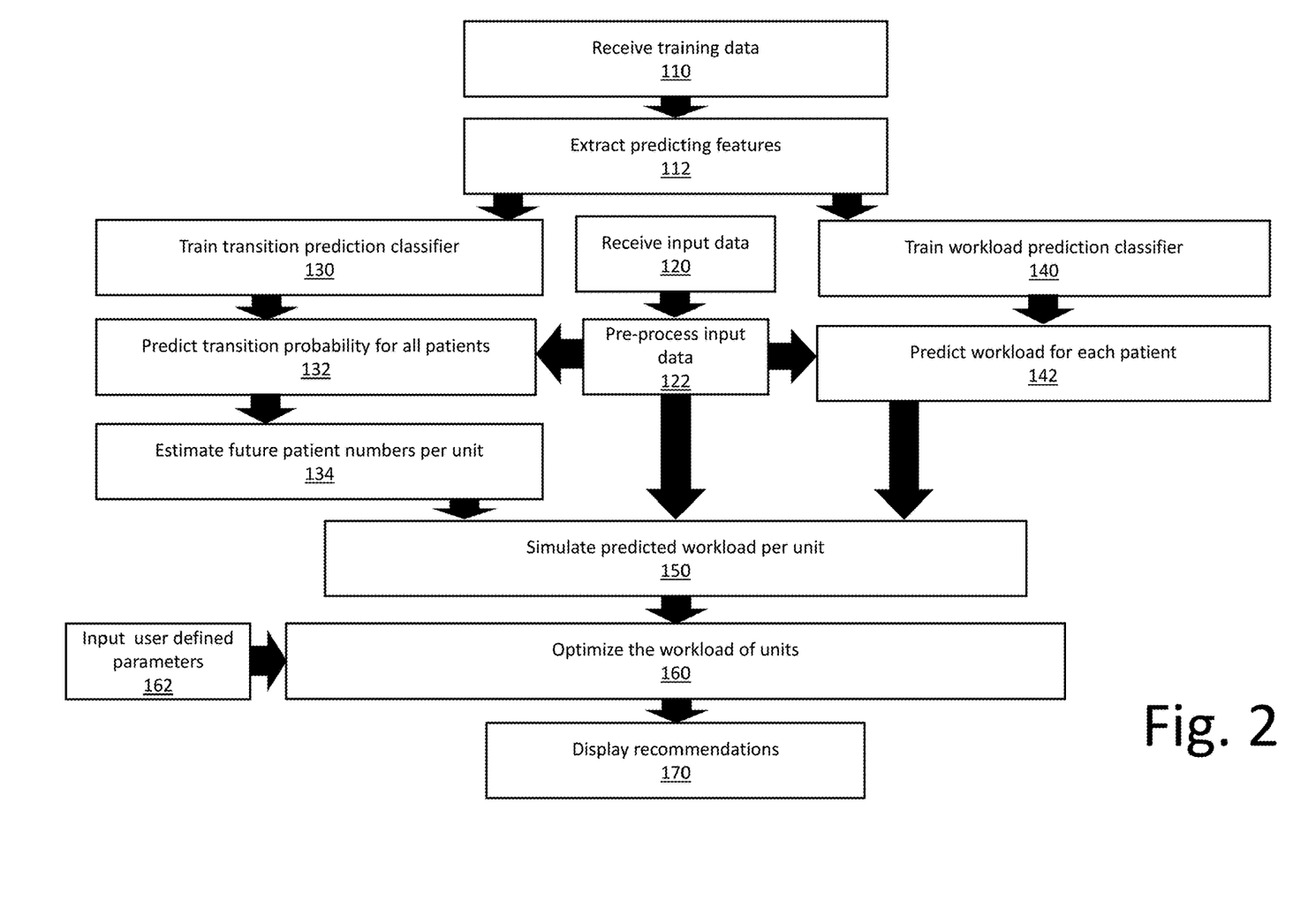
FIG. 2 is a flowchart of a method for generating staffing recommendations using a workload balancing system, in accordance with an embodiment.

Referring now to FIG. 2, according to an embodiment, as step 110 the workload balancing system 200 receives training data relating to transitions to train a classifier to determine predicted patient transitions. The training data can include data for a plurality of patients including diagnosis, current length of stay, demographic data, procedures, clinical events, vital signs, test results and physician orders. For example, the training data may comprise clinical data such as Admit/Discharge/Transfer ("ADT") orders, care plans and CPOEs, and any other relevant medical data.

According to an embodiment, at step 110 the workload balancing system 200 receives training data relating to workload to train a classifier to determine predicted patient workload. The training data can include medical data for a plurality of patients including but not limited to care plans/CPOE, reason for admission, patient characteristics, demographics, age, comorbidities, physiological measurements such as vital data, injury information, and physical observations, among many other types of medical information. This data may be time stamped or include information regarding how long it took to complete.

This training data may be stored in and/or received from one or more databases. The database may be a local and/or remote database. For example, the workload balancing system may comprise a database or other memory configured to store the input data.

According to an embodiment, the system may comprise a data pre-processor or similar component or algorithm configured to process the received training data. For example, the data pre-processor analyzes the training data to remove noise, bias, errors, and other potential issues. The data pre-processor may also analyze the input data to remove low quality data. Many other forms of data pre-processing or data point identification and/or extraction are possible.

At step 122, the system 200 can extract features from the training data received. Features are extracted from the historical medical information and utilized to train the machine learning algorithms of the system. At this step of the method, the system extracts patient transition and workload predicting features from the received training data. This can be accomplished by a variety of embodiments for feature identification, extraction, and/or processing, including any method for extracting features from a dataset.

According to an embodiment, the system extracts features to train a classifier to determine predicted patient transitions. The outcome of extracting patient predicting features step or module of the workload balancing system is a set of patient features related to medical information that may impact the future movements/transitions patients require, which thus comprises a training data set that can be utilized to train the classifier. The predicting features can include but are not limited to diagnosis, current length of stay, demographic data, procedures, clinical events, vital signs, test results and physician orders. The length of time it took to complete a care task, order, procedure, and/or test may also be extracted.

According to an embodiment, the system extracts features relevant to total patient workload to train a classifier to determine predicted workload per patient. The outcome of extracting patient predicting features step or module of the workload balancing system is a set of patient features related to medical information that may impact the future workload patients require, which thus comprises a training data set that can be utilized to train the classifier. The predicting features can include but are not limited to reason for admission, patient characteristics, demographics, age, comorbidities, physiological measurements such as vital data, injury information, and physical observations.

According to an embodiment where the training data received is a CPOE, the CPOE codes can be used directly as features. For the completed laboratory tests, values and timestamps that indicate the time the test was conducted can also be directly used as features. For problem list and the notes from diagnostic imaging, NLP (Natural Language Processing) can be used to extract key terms which indicate the problems and results from the specific tests.

At step 120 of the method, the workload balancing system 200 receives input data. The input data received in this step will be used by the system to at least generate estimated patient transitions, workload per patient, workload per unit, current staffing, and future staffing needs. The received patient data can include data relevant to known or future admissions, discharges, or transfers. This can include data including but not limited to patients current location, and any known future movements.

At step 120 of the method, the workload balancing system 200 receives clinical patient data comprising data about each individual patient at the hospital. This data can be obtained for individual patients in real time or it can be obtained periodically. The data can be received by the system through any means for example through broadcasted messages using systems such as HL7, FIHR, etc., directly via the Electronic Medical Record ("EMR"), or entered manually using the user interface.

The data can also include medical information for each patient such as care plans, treatments and orders prescribed by the physician and entered into the computerized physician order entry system ("CPOE"), the patient problem list that is populated by the care provider staff, and any diagnostic results already obtained. The data can also include the output from completed laboratory tests and diagnostic imaging notes. Further, this data can comprise information about each of the patients, including but not limited to demographics, physiological measurements such as vital data, injury information, and physical observations, among many other types of medical information.

At step 120 of the method, the workload balancing system 200 also receives staffing data. This data can include data relevant to staff scheduling including, current staff schedule, shift start time and end time, and credentials/license level for each staff members, among many other types of information. Staffing information may be pre-programmed into the workload balancing system or it may be obtained periodically or continually by communication with a database or other source of this information. For example, hospitals may maintain a database of current capacity and capabilities, and the workload balancing system may be configured to query that database to obtain that information. According to one embodiment the system receives staffing data directly from the hospital's staffing and/or scheduling systems and programs.

Additionally, the workload balancing system can receive information regarding the hospital's capacity and capability, such as but not limited to the number of beds, number of units, and the ability of the hospital to handle or treat specific types of patients or issues. Capacity and/or capability information may be pre-programmed into the workload balancing system or it may be obtained periodically or continually by communication with a database or other source of this information. For example, hospitals may maintain a database of current capacity and capabilities, and the workload balancing system may be configured to query that database to obtain that information.

Any data received by the system may be stored in one or more databases. The database may be a local and/or remote database. For example, the workload balancing system may comprise a database or other memory configured to store the input data.

Preferably, the received information comprises input data related to the training data for the trained classifier utilized by the system, to maximize the accuracy of the classifier. The information may be received from a local and/or remote database. The database may be a medical health record database, and/or any other database comprising the necessary information. According to an embodiment, the received information may be processed by the system such that it can be utilized by the trained classifier. For example, the system may identify, extract, and process one or more features for each patient for use by the classifier. Features may be utilized by the classifier immediately or may be stored for downstream or later use by the system.

At step 122, of the method, the system pre-processes the input data to translate it to a structured form. Pre-processing the received data outputs data into a form that can be ingested by the predictive analytic algorithms and processes.

According to an embodiment, the system can extract specific features from the received data. This can be accomplished by a variety of embodiments for feature identification, extraction, and/or processing, including any method for extracting features from a dataset. The outcome of a feature processing step or module of the system is a set of features related to medical information about patients, future transfers, admissions, or discharges, staffing, and hospital capacity and capability.

According to an embodiment where the data received is a patient's CPOE, the CPOE codes can be used directly as features. For the completed laboratory tests, values and timestamps that indicate the time the test was conducted can also be directly used as features. For problem list and the notes from diagnostic imaging, NLP (Natural Language Processing) can be used to extract key terms which indicate the problems and results from the specific tests.

According to an embodiment, the workload balancing system may comprise a data pre-processor or similar component or algorithm configured to process the received data. For example, the data pre-processor analyzes the data to remove noise, bias, errors, and other potential issues. The data pre-processor may also analyze the input data to remove low quality data. Many other forms of data pre-processing or data point identification and/or extraction are possible.

The system 200 using an algorithm to predict transition probabilities for each patient at the hospital. In other words, the probability that the patient will be discharged or transferred to another unit soon. Using these predictions, the system can predict the inflow arrival rate and future patient numbers for each unit.

At step 130, the system 200 trains the transition predictive classifier or model using the training data. According to an embodiment, the system trains the machine learning algorithm, which will be the classifier utilized to analyze transition rate information as described or otherwise envisioned herein. The machine learning algorithm is trained using the extracted features according to known methods for training a machine learning algorithm. In one embodiment, the transition rate can be predicted using a multi-class machine learning classifier or model.

According to an embodiment, the system uses a model that considers temporal data such as Recurrent Neural Networks (RNN). In a model considering temporal data more recent data can weigh heavier. For example, all vital signs from the last 24 hours can be taken into account, and more recent vital signs will have a higher weight in the predictive model. Another option is to use non-temporal machine learning tool such as XGBoost or Random forest in which case, historic data will be transferred to scalars (e.g., min, max, or average of the last 24 hours). Many other machine learning algorithms are also possible.

According to an embodiment, the machine learning models will be trained once with retrospective data and could be retrained periodically to capture changes. The trained model can be static such that it is trained once and is utilized for predicting. According to another embodiment, the trained model can be more dynamic such that it is updated or re-trained using subsequently available training data. The updating or re-training can occur constantly or periodically.

Following step 130, the workload balancing system 200 comprises a trained classifier that can be utilized to generate a patient transition prediction which comprises a model for each unit.

At step 132 of the method, the system uses the trained classifier to generate an estimate of the probability that each of the patients that are currently at the hospital will transit from one unit to another unit (e.g., from general ward to ICU) or be discharged. This prediction can be done for any amount of time in the future for example the system can generate an estimate of the probability that each of the patients that are currently at the hospital will transit or be discharged in the next 12 hours.

A separate model can be created for each unit for each patient. For example, for an Emergency Department ("ED") patient, the model will predict the probability that a patient will transit from ED to another unit, or will stay in ED, or will be discharged.

Periodically, for example every hour the machine-learning model will be triggered to predict the transition rate for all patients. The outcome of this step is a matrix of transition probabilities/predictions, where each row represents a patient, and each column represents a unit. An example of the matrix is illustrated in Table 1.

TABLE 1

| Patient | ED | GW | ICU | OR |
|---|---|---|---|---|
| 1 | 0 | 0.05 | 0.95 | 0 |
| 2 | 0.2 | 0.6 | 0.1 | 0.1 |
| 3 | 0 | 0.93 | 0.07 | 0 |
| 4 | 0 | 0.2 | 0.1 | 0.7 |

As shown in Table 1 the algorithm predicts the probabilities of being transferred to new unit for each patient. For example, Table 1 indicates there is a 95% chance patient 1 is transferred to the ICU.

In step 134 of the method, the system can use the generated transition predictions to predict future inflow and outflow rates for each unit. The generated transition predictions will allow supervisors of units to approximate how many patients per hour they are expected to have in the future. This will allow supervisors to prepare for the patients by appropriately staffing the unit ahead of time. The inflow for each unit can be predicted for any amount of time in the future, for example the inflow and outflow rates can be predicted for 12 or 24 hours in the future.

According to an embodiment, the workload balancing system can predict the workload for each patient using a machine trained algorithm and by calculating workload for known tasks using pre-calculated estimated times.

In step 140 of the method, the system can train a machine learning algorithm to predict the hourly workload that will be generated by each patient. The system can use the extracted training data comprising medical information for a plurality of patients to train the algorithm. According to an embodiment the system can use an algorithm that predicts the workload generated by each patient per hour based on medical condition, care plan, and demographic data.

According to an embodiment, the system utilizes the trained workload machine learning algorithm to predict an hourly workload for the next 12 hours for a patient. The workload of the patient can be predicted for any amount of time in the future. The most immediate need for the prediction will be within the next 24 hours, and specifically the workload prediction for the next staffing shift foe example the next 8-12 hours. Therefore, according to one embodiment the system predicts the workload of a patient for the next 12 hours.

In step 142 of the method, according to an embodiment, the workload balancing system can predict the workload for each patient. Workload can be predicted using any known methods alone or in combination such as but not limited to machine learning algorithms, or assigning known tasks an estimated time. According to one embodiment, for admitted patients, the workload can be estimated by using the patient's existing care plan/CPOE. The tasks set out in the care plan can be mapped onto a table where each task is assigned to a time. For example, administrating medication: 5 minutes, vital signs: 3 minutes, X-ray imaging: 20 minutes . . . ). This process can also be done for known future admissions or transfers. Other methods of predicting workload where the care plan is known can also be used.

In addition, a scaling factor can be applied to predicted workloads for patients that are more fragile and need extra care and support. The scaling factor component can utilize existing assessment results, for example those stored in the EMR system. A mapping of assessment score to factor can be used to compute total scaled workload per patient. For example, assume a score between 1 to 5, where 5 indicates the highest need patients. Then a mapping could be: 1→0.8, 2→0.9, 3→1, 4→1.1, 5→1.2. In this case, the total workload of a patient with score of 5, will be the patient's predicted workload multiplied by 1.2.

For each patient, a workload prediction is computed for each unit with positive transition probability. For example, for a patient in ed that have a positive probability to stay in ed or be transitioned to a general ward unit or to an intensive care unit, the algorithm will predict three workloads: if staying in ED, if transit to general ward unit, and if transit to intensive care unit. The first few hours after a patient's transit typically have a higher workload and this will also be considered. According to an embodiment the system accounts for a patients higher workload after transit using a binary feature representation for new patient.

In step 150 of the method the system can predict the workload for a unit for a period of time. According to one embodiment the overall workload for the unit is predicted using a simulation engine. The simulation predicts workload for the next 12 hours for each unit using the predicted transition probabilities and the predicted workload for each patient. The prediction can be made for shorter or longer periods of time. The outcome of the simulation is a matrix of confidence intervals, where each element represents the overload/underload of staff per unit/hour.

In one embodiment, the simulation process comprises the following steps: (1) set workload of all units to zero; (2) for each patient: (i) realize transit based on the predicted transit probabilities; (ii) add the workload associated with the realized transit to the relevant unit; and (iii) divide the total hourly unit workload by total number of nurses at that hour. (3) repeat steps 1-4 k times (where k is a large number) and store the results; and (4) for each unit, compute 90% confidence interval from the results of all repetitions.

Table 2 below illustrates a possible outcome from the simulation engine for four hours and four units:

TABLE 2

| Hour/Unit | ED | GW | ICU | OR |
|---|---|---|---|---|
| 8 AM-9 AM | [80%, 120%] | [90%, 100%] | [80%, 120%] | [90%, 115%] |
| 9 AM-10 AM | [110%, 130%] | [115%, 125%] | [110%, 130%] | (120%, 135%] |
| 10 AM-11 AM | [70%, 90%] | [60%, 80%] | [110%, 120%] | [120%, 140%] |
| 11 AM-12 PM | [85%-95%] | [80%-90%] | [85%-100%] | [110%-130%] |

Figure 3:
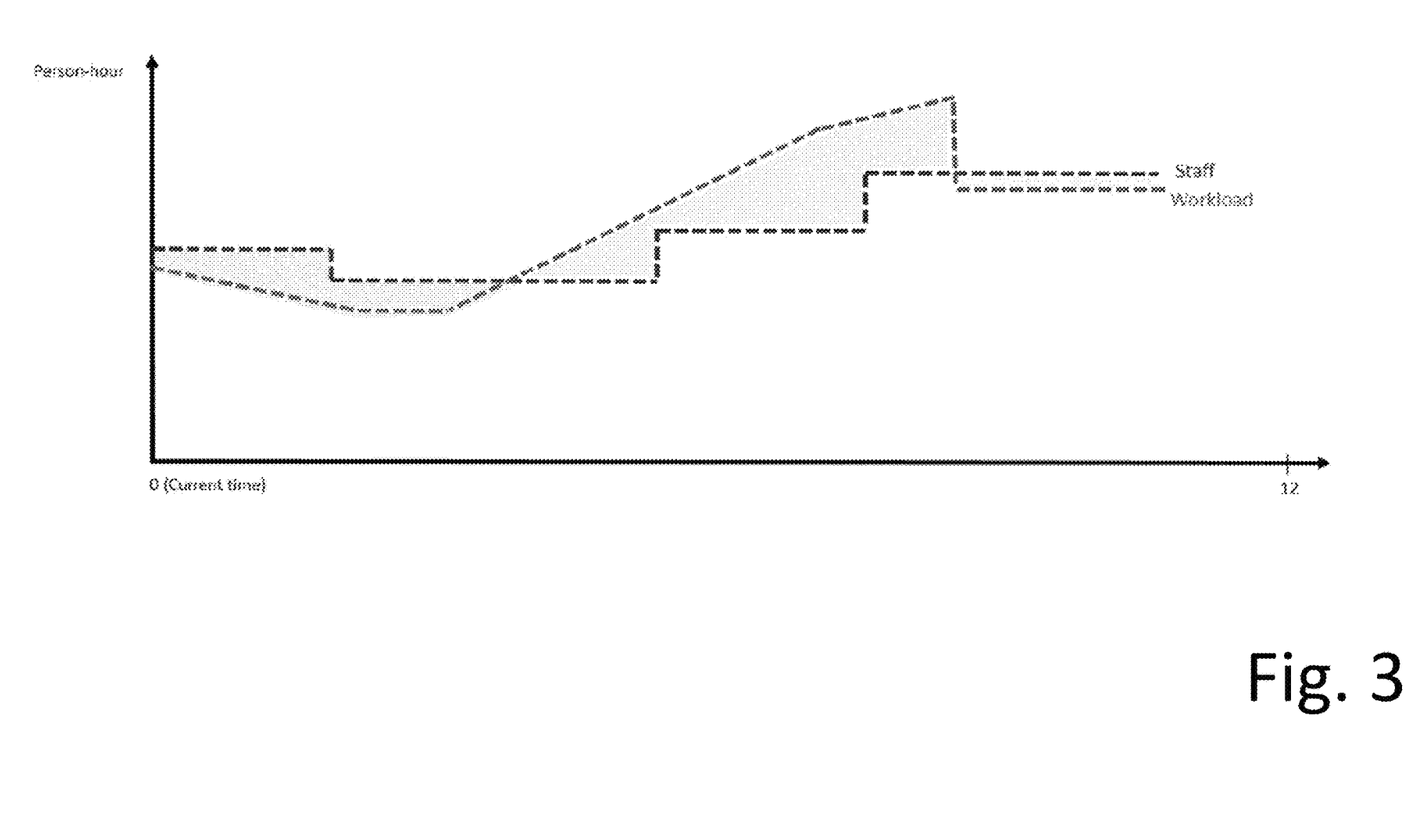
FIG. 3 is a graph depicting a relationship between staff and workload over time.

Referring now to FIG. 3, an example of the outcome of the simulation for a specific unit, is illustrated in the graph. As shown, the current staffing workload capability is plotted over time. This information can be predicted based on the received staffing input data. The predicted workload that will be generated based on the patients is also plotted over time. The portion of the graph where the staff line is below the workload line indicates that the staff will be overloaded for that time, where the workload line is below the staff line indicates that the staff will be underloaded for that time.

In step 160, the system determines the optimal way of staffing nurses to reduce total overload. According to an embodiment, the system can comprise an optimization engine such as a genetic algorithm to analyze the best staffing plan among all units and generate recommendations to staff nurses prior to the next shift.

According to an embodiment, in order to determine how to best shift and staff nurses to reduce total overload, the optimization engine of the system takes into account (1) Current number of nurses at each unit and the number of nurses that are planned to be at each unit for the next 12 hours; (2) Overload sensitivity per unit; (3) Minimum staff-patients ratio; (4) Overload sensitivity per unit; (5) The low and high bounds of the estimated workload of the unit; and (6) Interchangeability matrix.

A step 162, a user can program user defined parameters into the optimization engine such as but not limited to minimum staff-patients ratio, overload sensitivity per unit; and interchangeability matrix. These parameters can be input using the communications interface of the system and can be stored or updated at any time.

The minimum staff-patients ratio is taken into consideration in case that there are regulatory or policy constraints on the ratio between number of nurses and patients. Overload sensitivity per unit represents how critical it is for the unit not to be overloaded with regards to the workload confidence interval. The interchangeability matrix identifies nurses from which units can be shifted to which another unit. Table 3, illustrates an example of an interchangeability matrix.

TABLE 3

| From/to | PICU | RICU | SDU | ER | MED | SURG |
|---|---|---|---|---|---|---|
| PICU | X | X | X | X | X | X |
| RICU | X | X | X | X | X | X |
| SDU |  |  | X | X | X |  |
| ER |  |  | X | X |  |  |
| MED |  |  |  | X | X | X |
| SURG |  |  |  |  | X | X |

The inputs of the optimization engine are represented by:
(1) The number of nurses at unit (i) at time (t) is donated by ($N_{it}$)
(2) Overload sensitivity per unit, denoted by ($C_i \in [0,1]$)
(3) Minimum staff-patients ratio of unit (i) by (MO)
(4) The low and high bounds of the estimated workload of unit (i) at time (t) denoted by ($WL_{it}$) and ($WH_{it}$)
(5) Interchangeability matrix. Denote the matrix by (Y), where ($Y_{ij}=1$) means that nurse can shift from unit (i) to unit (j).

According to an embodiment, the overload sensitivity per unit is denoted by ($C_i \in [0,1]$) where the value of one means that the highest value of the confidence interval should be used in the optimization objective function, while value of zero means that the lowest value should be used for the optimization objective. This will lead to units which are more sensitive to overload (for example ED and ICU) to get more resources when overloaded when compared to units with lower sensitivity.

The optimization function can be solved by any optimization engine such as a genetic algorithm. According to an embodiment, in order to determine ($X_{ijt}$) (the number of nurses to be shifted from unit (i) to unit (j) at hour (t)) to reduce total overload, the system is configured to minimize the rate between workload and the number of nurses by shifting nurses. To ensure this is achieved with a minimum number of shifting; the system introduces a penalty (R) for each shifting representing the time and effort required per shifting. An example of the objective function is:

$$\min \sum_{k=1}^{12} \sum_{i=1}^{U} \frac{WL_{it} + C_i * (WH_{it} - WL_{it})}{N_{it} + \sum_{m=1}^{U} X_{mjt} - \sum_{m=1}^{U} X_{imt}} + \quad \text{(Eq. 1)}$$

$$R * \sum_{k=1}^{U} \sum_{j=1}^{U} \sum_{k=1}^{12} X_{ijt}$$

Subject to:

$$(1) \frac{PL_{it} + C_i * (PH_{it} - PL_{it})}{N_{it} + \sum_{m=1}^{U} X_{mjt} - \sum_{m=1}^{U} X_{imt}} \leq M_i \forall t, i \quad \text{(Eq. 2)}$$

$$(2) X_{ijt} \leq Y_{ijt} \quad \text{(Eq. 3)}$$

The first constraint (Eq. 2) guaranties that the ratio between nurses and patients will not be smaller than the pre-defined ratio. The second constraint (Eq. 3) guarantees that a shift can be done only if it is consistent with the Interchangeability matrix.

The output of the optimization engine is a set of recommendations to shift staff to minimize the total overload of the hospital. At step 170 of the method, the system displays the staffing prediction report on a display of the system. According to an embodiment, the display may comprise recommendations for how many nurses should be shifted at each hour from/to which unit as well as information about predicted occupancy, arrivals, staffing.

Figure 4:
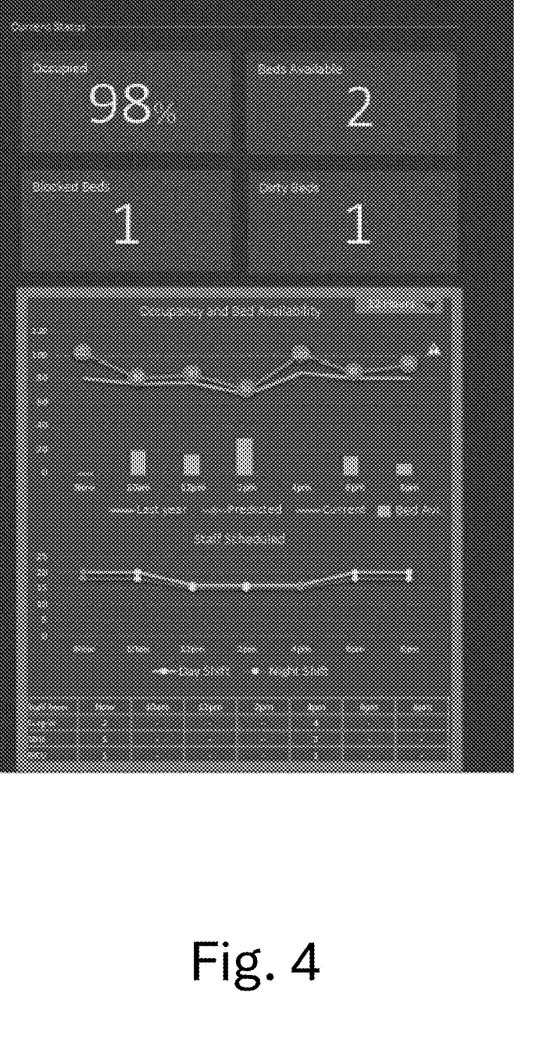
FIG. 4 is a graphic user interface of an example of the workload balancing system, in accordance with an embodiment.

Referring now to FIG. 4, the output can be displayed on the user interface such as a dashboard for the nurse manager/house supervisor. It can include visualization of the predicted demand versus staff availability and a recommendation on staff shifting. other information is possible as well. Alternatively, the report may be communicated by wired and/or wireless communication to another device. For example, the system may communicate the report to a mobile phone, computer, laptop, wearable device, and/or any other device configured to allow display and/or other communication of the report.

According to an embodiment, the user interface of the system can display the predicted workload in real time and recommendations to shift nurses that are generated by the algorithm. The recommendations can be displayed alongside the predictions. A nurse manager/supervisor can use the predictions to determine future staff changes prior to shift change.

Figure 5:
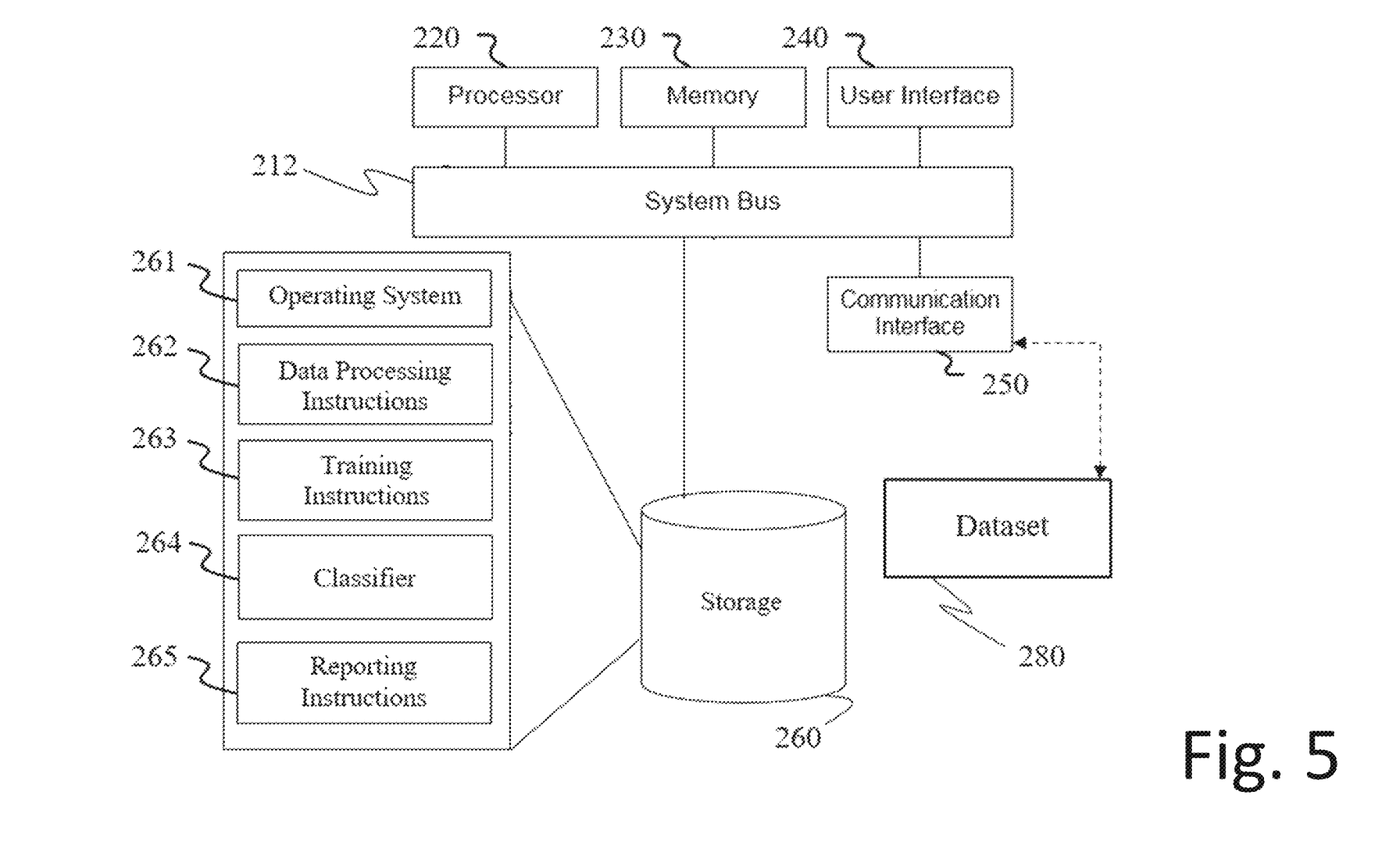
FIG. 5. is a schematic representation of a workload balancing system, in accordance with an embodiment.

Referring to FIG. 5, in one embodiment, is a schematic representation of a workload balancing system 200. System 200 may be any of the systems described or otherwise envisioned herein, and may comprise any of the components described or otherwise envisioned herein.

According to an embodiment, system 200 comprises one or more of a processor 220, memory 230, user interface 240, communication interface 250, and storage 260, interconnected via one or more system buses 212. It will be understood that FIG. 2 constitutes, in some respects, an abstraction and that the actual organization of the components of the system 200 may be different and more complex than illustrated.

According to an embodiment, system 200 comprises a processor 220 capable of executing instructions stored in memory 230 or storage 260 or otherwise processing data to, for example, perform one or more steps of the method. Processor 220 may be formed of one or multiple modules. Processor 220 may take any suitable form, including but not limited to a microprocessor, microcontroller, multiple microcontrollers, circuitry, field programmable gate array (FPGA), application-specific integrated circuit (ASIC), a single processor, or plural processors.

Memory 230 can take any suitable form, including a non-volatile memory and/or RAM. The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices. The memory can store, among other things, an operating system. The RAM is used by the processor for the temporary storage of data. According to an embodiment, an operating system may contain code which, when executed by the processor, controls operation of one or more components of system 200. It will be apparent that, in embodiments where the processor implements one or more of the functions described herein in hardware, the software described as corresponding to such functionality in other embodiments may be omitted.

User interface 240 may include one or more devices for enabling communication with a user. The user interface can be any device or system that allows information to be conveyed and/or received, and may include a display, a mouse, and/or a keyboard for receiving user commands. In some embodiments, user interface 240 may include a command line interface or graphical user interface that may be presented to a remote terminal via communication interface 250. The user interface may be located with one or more other components of the system, or may located remote from the system and in communication via a wired and/or wireless communications network.

Communication interface 250 may include one or more devices for enabling communication with other hardware devices. For example, communication interface 250 may include a network interface card (NIC) configured to communicate according to the Ethernet protocol. Additionally, communication interface 250 may implement a TCP/IP stack for communication according to the TCP/IP protocols. Various alternative or additional hardware or configurations for communication interface 250 will be apparent.

Storage 260 may include one or more machine-readable storage media such as read-only memory (ROM), random-access memory (RAM), magnetic disk storage media, optical storage media, flash-memory devices, or similar storage media. In various embodiments, storage 260 may store instructions for execution by processor 220 or data upon which processor 220 may operate. For example, storage 260 may store an operating system 261 for controlling various operations of system 200.

It will be apparent that various information described as stored in storage 260 may be additionally or alternatively stored in memory 230. In this respect, memory 230 may also be considered to constitute a storage device and storage 260 may be considered a memory. Various other arrangements will be apparent. Further, memory 230 and storage 260 may both be considered to be non-transitory machine-readable media. As used herein, the term non-transitory will be understood to exclude transitory signals but to include all forms of storage, including both volatile and non-volatile memories.

While system 200 is shown as including one of each described component, the various components may be duplicated in various embodiments. For example, processor 220 may include multiple microprocessors that are configured to independently execute the methods described herein or are configured to perform steps or subroutines of the methods described herein such that the multiple processors cooperate to achieve the functionality described herein. Further, where one or more components of system 200 is implemented in a cloud computing system, the various hardware components may belong to separate physical systems. For example, processor 220 may include a first processor in a first server and a second processor in a second server. Many other variations and configurations are possible.

According to an embodiment, system 200 may comprise or be in remote or local communication with a database or data source 215. Database 215 may be a single database or data source or multiple. Database 215 may comprise the input data which may be used to train the classifier, as described and/or envisioned herein.

According to an embodiment, storage 260 of system 200 may store one or more algorithms and/or instructions to carry out one or more functions or steps of the methods described or otherwise envisioned herein. For example, processor 220 may comprise one or more of data processing instructions 262, training instructions 263, classifier 264, and/or reporting instructions 265.

According to an embodiment, data processing instructions 262 direct the system to retrieve and process input data which is used to either: (i) train a classifier 264 using the training instructions 263, (ii) to perform predictions for transitions and workloads using a trained classifier 264; or (iii) to perform optimization engine processes. The data processing instructions 262 direct the system to, for example, receive or retrieve input data or training data to be used by the system as needed, such as from database 215 among many other possible sources. As described above, the input and training data can comprise a wide variety of input types from a wide variety of sources.

According to an embodiment, the data processing instructions 262 also direct the system to process the input data to generate a plurality of features related to transition and workload information for a plurality of patients, which are used to train the classifier(s). This can be accomplished by a variety of embodiments for feature identification, extraction, and/or processing. The outcome of the feature processing is a set of features related to transition and workload for a cohort of previously monitored patients, which thus comprises a training data set that can be utilized to train the classifier(s).

According to an embodiment, training instructions 263 direct the system to utilize the processed data to train the classifier(s) to determine (1) a transition probability and (2) a workload prediction. The classifiers can be any machine learning classifier sufficient to utilize the type of input data provided. Thus, the system comprises trained classifiers 264 configured to determine transition probabilities and workload predictions. The trained classifiers 264 are configured to determine transition probabilities and workload predictions.

According to an embodiment the reporting instructions 265 can direct and instruct the system on how and when to run the simulation or optimization. According to an embodiment, reporting instructions 265 direct the system to generate and provide staffing recommendations. The recommendations report may comprise recommendations for how many nurses should be shifted at each hour from/to which unit as well as information about predicted occupancy, arrivals, staffing. The report may comprise many different configurations and information. The recommendations may be a no shift change recommendation. The reporting instructions 265 also direct the system to display the report on a display of the system. Alternatively, the report may be communicated by wired and/or wireless communication to another device. For example, the system may communicate the report to a mobile phone, computer, laptop, wearable device, and/or any other device configured to allow display and/or other communication of the report.

According to an embodiment, the workload balancing system is configured to process many thousands or millions of datapoints in the training data used to train the classifiers, as well as the input data. For example, generating a functional and skilled trained classifiers using an automated process such as feature identification and extraction and subsequent training requires processing of millions of datapoints from input data and the generated features. This can require millions or billions of calculations to generate a novel trained classifier from those millions of datapoints and millions or billions of calculations. As a result, each trained classifier is novel and distinct based on the input data and parameters of the machine learning algorithm. Thus, generating a functional and skilled trained classifier comprises a process with a volume of calculation and analysis that a human brain cannot accomplish in a lifetime, or multiple lifetimes.

Similarly, the workload balancing system can be configured to continually receive data about the patients, staffing and hospital perform the analysis, and provide periodic or continual updates via the report. This requires the analysis of thousands or millions of datapoints on a continual basis to optimize the reporting, requiring a volume of calculation and analysis that a human brain cannot accomplish in a lifetime.

By providing advanced staffing recommendations, this novel workload balancing system has an enormous positive effect workload compared to prior art systems. As just one example, by providing a system that can factor in the best possible staffing plans for a hospital to reduce overload can ensure patients receive better care while also saving hospitals money by avoided underloading. The information needed by a human for adequate making staffing predictions, particularly for an entire hospital, is likely to be incomplete and the recommendations are likely to be flawed compared to the predictions performed by the novel systems and methods described or otherwise envisioned herein.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A method for generating, using a workload balancing system, staffing recommendations, the method comprising:
   receiving, by the workload balancing system, transition data for each of a plurality of patients;
   receiving, by the workload balancing system, medical data for each of the plurality of patients;
   receiving, by the workload balancing system, staffing data;

determining, by a processor of the workload balancing system comprising a trained transition machine learning algorithm and using the received transition data, the received medical data, and the received staffing data, a transition probability for each patient of a plurality of patients, wherein the transition probability comprises an estimated probability of the patient being transferred from one unit to another unit in a hospital or discharged from the hospital within a particular time period;

determining, by a processor of the workload balancing system using the received transition data, the received medical data, and the received staffing data, a predicted workload to be generated by each of the plurality of patients;

simulating, by the processor of the workload balancing system using the transition probability for each of the plurality of patients and the predicted workload to be generated by each of the plurality of patients, a predicted workload for each of a plurality of units in the hospital;

generating, by the processor of the workload balancing system comprising an optimization engine and using the received transition data, the received medical data, the received staffing data, and the predicted workload for each of the plurality of units, staffing recommendations to balance overall workload in the hospital; and displaying the generated staffing recommendations on a user display of the workload balancing system.

2. The method of claim 1, further comprising pre-processing, by the processor of the workload balancing system, the received transition data, the received medical data, and the received staffing data.

3. The method of claim 1, further comprising training the transition machine learning algorithm, comprising: receiving a dataset of transition data, the dataset comprising the transition data for each of the plurality of patients; extracting from the dataset features indicative of patient transitions; and training the transition machine learning algorithm using the extracted features.

4. The method of claim 1, wherein a trained workload machine learning algorithm is used in determining, by the processor of the workload balancing system using the received transition data, the received medical data, and the received staffing data, a predicted workload to be generated by each of the plurality of patients.

5. The method of claim 4, further comprising training the workload machine learning algorithm, comprising: receiving a dataset of medical data, the dataset comprising the medical data for each of the plurality of patients; extracting from the dataset features indicative of patient workload; and training the workload machine learning algorithm using the extracted features.

6. The method of claim 1, further comprising determining, by processor of the workload balancing system using the received transition data, the received medical data, and the received staffing data using the predicted transition probability for each of the plurality of patients, a predicted inflow and outflow rate for each of the plurality of units.

7. The method of claim 1, wherein the trained transition machine learning algorithm is a Recurrent Neural Networks algorithm.

8. The method of claim 1, further comprising: (1) setting workload of all units to zero; (2) for each patient of the plurality of patients: (i) realizing transit based on the predicted transit probability; (ii) adding a workload associated with the realized transit to the relevant unit; and (iii) dividing the total hourly unit workload by total number of nurses at that hour; (3) repeating (1)-(4) one or more times and storing results; and (4) for each unit, computing 90% confidence interval from the results of all repetitions.

9. The method of claim 1, further comprising inputting, user defined parameters into the optimization engine.

10. A workload balancing system for generating staffing recommendations, the system comprising:
a classifier trained to generate a transition probability for each of a plurality of patients; and
a processor configured to:
receive data comprising medical data about each of the plurality of patients, transition data for each of the plurality of patients, and staffing data;
determine, using the classifier and using the received data, a transition probability for each patient of the plurality of patients, wherein the transition probability comprises an estimated probability of the patient being transferred from one unit to another unit in a hospital or discharged from the hospital within a particular time period;
determine, using the received data, a predicted workload to be generated by each of the plurality of patients;
simulate, using the transition probability for each of the plurality of patients and the predicted workload to be generated by each of the plurality of patients, a workload for each of a plurality of units in the hospital; and
generate, using the simulated workload for each of the plurality of units, staffing recommendations to balance overall workload in the hospital; and
a display configured to display the generated staffing recommendations.

11. The system of claim 10, wherein the processor is further configured to train the transition machine learning algorithm, comprising: receiving a dataset of transition data, the dataset comprising transition data for each of a plurality of patients; extracting from the dataset features indicative of patient transitions; and training the transition machine learning algorithm using the extracted features.

12. The system of claim 11, wherein the processor is configured to use the a trained workload machine learning algorithm to determine the predicted workload to be generated by each of the plurality of patients.

13. The system of claim 12, wherein the processor is configured to train the workload machine learning algorithm, comprising: receiving a dataset of medical data, the dataset comprising medical data for each of a plurality of patients; extracting from the dataset features indicative of patient workload; and training the workload machine learning algorithm using the extracted features.

14. The system of claim 10, wherein the processor is configured to determine using the received data using the predicted transition probabilities for each of the plurality of patients, a predicted inflow and outflow rate for each of the plurality of units.

15. The system of claim 10, further comprising:
a communication interface configured to receive the data comprising the medical data about each of the plurality of patients, the transition data for each of the plurality of patients, and the staffing data.

16. A non-transitory computer-readable storage medium having stored a computer program comprising instructions, which, when executed by one or more processors, cause the one or more processors to:

receive data comprising medical data about each of the plurality of patients, transition data for each of the plurality of patients, and staffing data;

determine, using a classifier and the received data, a transition probability for each of the plurality of patients, wherein the classifier is trained to generate a transition probability for each patient of the plurality of patients, wherein the transition probability comprises an estimated probability of the patient being transferred from one unit to another unit in a hospital or discharged from the hospital within a particular time period;

determine, using the received data, a predicted workload to be generated by each of the plurality of patients;

simulate, using the transition probability for each of the plurality of patients and the predicted workload to be generated by each of the plurality of patients, the workload for each of a plurality of units in the hospital;

generate, using the simulated workload for each of the plurality of units, staffing recommendations to balance overall workload in the hospital; and display the generated staffing recommendations.

17. The non-transitory computer-readable storage medium of claim 16, wherein the instructions, when executed by the one or more processors, further cause the one or more processors to train the transition machine learning algorithm, comprising: receiving a dataset of transition data, the dataset comprising transition data for each of a plurality of patients; extracting from the dataset features indicative of patient transitions; and training the transition machine learning algorithm using the extracted features.

18. The non-transitory computer-readable storage medium of claim 17, wherein the instructions, when executed by the one or more processors, further cause the one or more processors to use the trained workload machine learning algorithm to determine the predicted workload to be generated by each of the plurality of patients.

19. The non-transitory computer-readable storage medium of claim 18, wherein the instructions, when executed by the one or more processors, further cause the one or more processors to train the workload machine learning algorithm, comprising: receiving a dataset of medical data, the dataset comprising medical data for each of a plurality of patients; extracting from the dataset features indicative of patient workload; and training the workload machine learning algorithm using the extracted features.

20. The non-transitory computer-readable storage medium of claim 16, wherein the instructions, when executed by the one or more processors, further cause the one or more processors to determine using the received data using the predicted transition probabilities for each of the plurality of patients, a predicted inflow and outflow rate for each of the plurality of units.

* * * * *